United States Patent [19]
Murata

[11] Patent Number: 5,258,836
[45] Date of Patent: Nov. 2, 1993

[54] ENCODING OF MOTION PICTURE SIGNAL
[75] Inventor: Eri Murata, Tokyo, Japan
[73] Assignee: NEC Corporation, Tokyo, Japan
[21] Appl. No.: 878,471
[22] Filed: May 5, 1992
[30] Foreign Application Priority Data
  May 8, 1991 [JP] Japan .................. 3-133540
[51] Int. Cl.$^5$ ............................ H04N 7/137
[52] U.S. Cl. ..................... 358/136; 358/85; 358/105; 379/53
[58] Field of Search ............ 358/136, 105, 85; 379/53

[56] References Cited
U.S. PATENT DOCUMENTS

| | | | |
|---|---|---|---|
| 4,383,272 | 5/1983 | Netravali | 358/136 |
| 4,656,511 | 4/1987 | Koga | 358/136 |
| 4,991,009 | 2/1991 | Suzuki | 358/136 |
| 4,996,594 | 2/1991 | Murayami | 358/136 |

OTHER PUBLICATIONS

"A Color Motion Videophone for the ISDN", Report No. D-233, 1989.
Spring Grand Conference, The Institute of Electronics, Information . . .
"A Method for facial region detection on a color video phone", Report No. Dp, 1989 Spring Grand Conf., The Institute of Electronics . . .

Primary Examiner—Howard W. Britton
Attorney, Agent, or Firm—Foley & Lardner

[57] ABSTRACT

A valid/invalid detection section 1 generates an original valid block map based on a difference between frames. The current and previous valid block maps are weighted within weight sections 2 and 3 respectively and are thereafter summed up to compose them. After isolated valid blocks are removed from the composed valid block map within a segmentation section 5, it is determined whether or not a moving object exists and the direction of the moving object is determined based on the distribution of the valid block map. If a significant movement is detected, then blocks around the object are weighted at the movement direction side. Another segmentation section 7 determines valid blocks with reference to interest blocks and neighbor blocks, and isolated invalid block section 8 removes isolated invalid blocks to generate a complete valid block map. Encoding is performed based on the complete valid block map.

5 Claims, 5 Drawing Sheets

| Ø | Ø | Ø | 2 | Ø | Ø | Ø | Ø | Ø |
|---|---|---|---|---|---|---|---|---|
| Ø | Ø | Ø | Ø | Ø | Ø | Ø | Ø | 2 |
| Ø | 2 | Ø | 1 | 1 | 3 | 3 | 2 | Ø |
| Ø | 2 | Ø | 1 | 3 | 3 | 3 | 2 | Ø |
| Ø | Ø | 1 | 1 | 3 | 3 | 1 | 3 | Ø |
| Ø | 1 | 1 | 3 | 3 | 1 | 1 | 1 | 2 | Ø |
| Ø | 1 | 1 | 3 | 3 | 1 | 1 | 1 | 2 | Ø |
| Ø | 1 | 1 | 3 | 3 | 1 | 1 | 1 | 2 | Ø |

FIG. 6

| Ø | Ø | Ø | Ø | Ø | Ø | Ø | Ø | Ø |
|---|---|---|---|---|---|---|---|---|
| Ø | Ø | Ø | Ø | Ø | Ø | Ø | Ø | Ø |
| Ø | Ø | Ø | 1 | 1 | 3 | 3 | 2 | Ø |
| Ø | Ø | Ø | 1 | 3 | 3 | 3 | 2 | Ø |
| Ø | Ø | 1 | 1 | 3 | 3 | 1 | 3 | Ø |
| Ø | 1 | 1 | 3 | 3 | 1 | 1 | 1 | 2 | Ø |
| Ø | 1 | 1 | 3 | 3 | 1 | 1 | 1 | 2 | Ø |
| Ø | 1 | 1 | 3 | 3 | 1 | 1 | 1 | 2 | Ø |

| a | b | c |
|---|---|---|
| d | k | e |
| f | g | h |

FIG.8

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 1 | 3 | 3 | 3 | 0 | 0 |
| 0 | 0 | 0 | 1 | 3 | 3 | 3 | 0 | 0 |
| 0 | 0 | 1 | 3 | 3 | 1 | 4 | 0 | 0 |
| 0 | 1 | 1 | 3 | 3 | 1 | 1 | 3 | 0 |
| 0 | 1 | 1 | 3 | 3 | 1 | 1 | 3 | 0 |
| 0 | 1 | 1 | 3 | 3 | 1 | 1 | 3 | 0 |

ENCODING OF MOTION PICTURE SIGNAL

BACKGROUND OF THE INVENTION

The present invention relates to encoding a motion picture signal using band compression techniques, and more particularly to detecting an interest image region, for example the image of a speaker using a video telephone, and then encoding only the interest image region.

As a prior approach for encoding a motion picture signal using band compression techniques, "A Color Motion Videophone for the ISDN", Report No. D-233, 1989 Spring Grand Conference, The Institute of Electronics, Information and Communication Engineers of Japan is known. According to this approach, a facial region is detected to generate a map representing the facial region and an image encoding section performs interframe/ inframe adaptive predictive encoding of picture elements of the current frame, using picture elements of the previous frame and current adjacent picture elements. When a picture element to be encoded is in the facial region, the encoding is repeated to the final stage, and otherwise the encoding is stopped at the stage immediately before the final stage.

However, the prior approach still performs course encoding of a background part or a part other than facial region, and then noise related to the background part causes unnecessary information. Further when picture elements are converted from the background part to the facial region between consecutive frames the course encoding is switched to the fine encoding, and then considerable predictive error signals are generated, which result in more unnecessary information. Accordingly, the encoding efficiency deteriorates.

Another prior approach is disclosed in "A method for facial region detection on a color video phone", Report No. D-92, 1989 Spring Grand Conference, The Institute of Electronics, Information and Communication Engineers of Japan. According to this conventional approach, a facial region is detected using histograms of picture elements having values larger than a threshold value in a differential image between consecutive frames. At first a vertical histogram is generated by counting significant picture elements in the differential image horizontally, and is used for determination of the top of the face. And the image is divided into horizontal band sub-areas and then horizontal histograms are generated for the sub-areas by counting significant picture elements in the sub-areas vertically. The width of the face is determined based on the several horizontal histograms for the sub-areas beneath the top position of the face, and height of the face is determined proportional to the face width.

However, this approach doesn't directly detect the outline of the face, and doesn't extract correctly the facial region for fine encoding. Further, this article doesn't suggest encoding only the facial part to reduce unnecessary information caused by noise in the background part

SUMMARY OF THE INVENTION

As with video telephones, while a speaker is in motion, the background part is still. According to the present invention, a moving interest part such as the face of a speaker is detected by using differential image between frames. Further this detection is corrected based on the movement direction of the interest part. Responsive to the corrected detection, only a part of a motion picture signal corresponding to the interest part is exactly extracted and encoded. As a result, unnecessary encoding information generated by noise in the background can be obviated and the efficiency can be improved.

Figure 2:
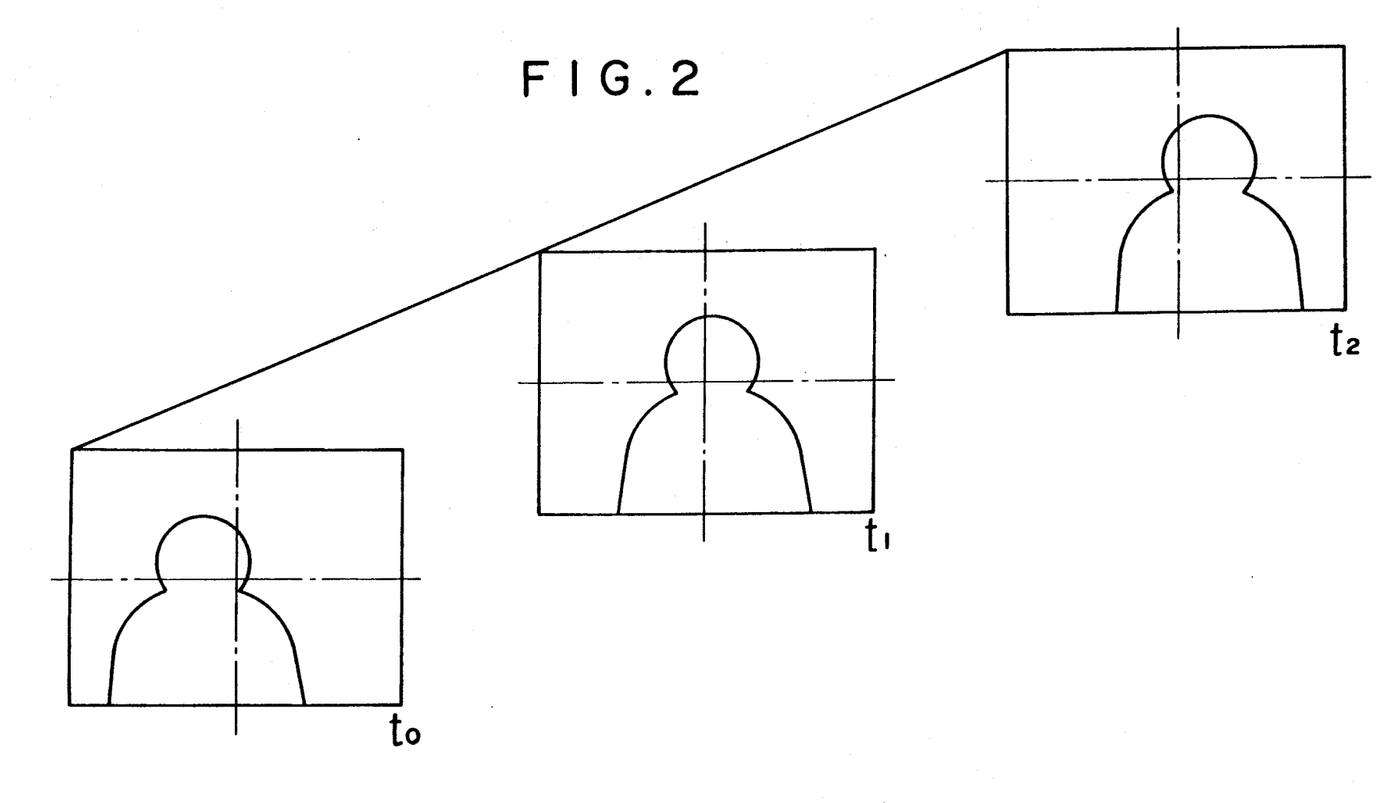
FIG. 2 is a drawing for illustrating the principles of the present invention, in which a speaker is shown as moving from a time "t0" to "t1", from the time "t1" to "t2".
Figure 3:
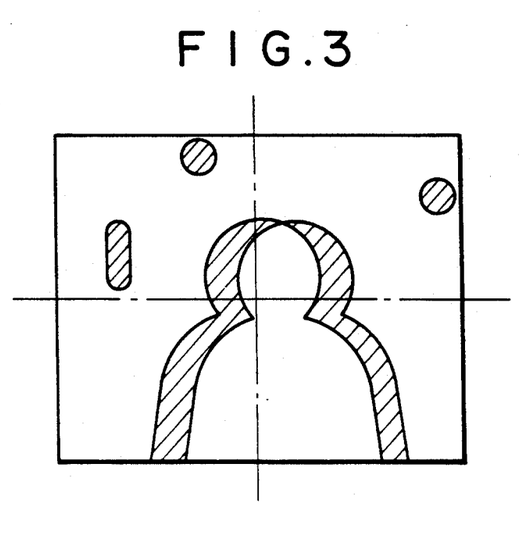
FIG. 3 is a drawing for illustrating the principles of the present invention, which shows areas having a significant difference between the frames at the times "t1" and "t2".

How to extract an interest part, for example a speaker part, is described with reference to the drawings. Suppose a speaker moves as shown in FIG. 2 from time "t0" to time "t1", and from time "t1" to time "t2". At first, regions having difference between the frames at the times t1 and t2 are detected as illustrated in FIG. 3 with hatching. Hatching portions in the background are caused by differential signals generated from noise in the background. Next, the frame is divided into blocks of picture elements in m rows x n columns, and each block is determined as valid if the sum of the absolute values of differential signals in the block is larger than or equal to a predetermined first threshold value, and the block is determined as invalid if the sum is less than the threshold value. A valid block map thus obtained is illustrated in FIG. 4B, in which valid blocks are indicated with hatching.

Figure 4:
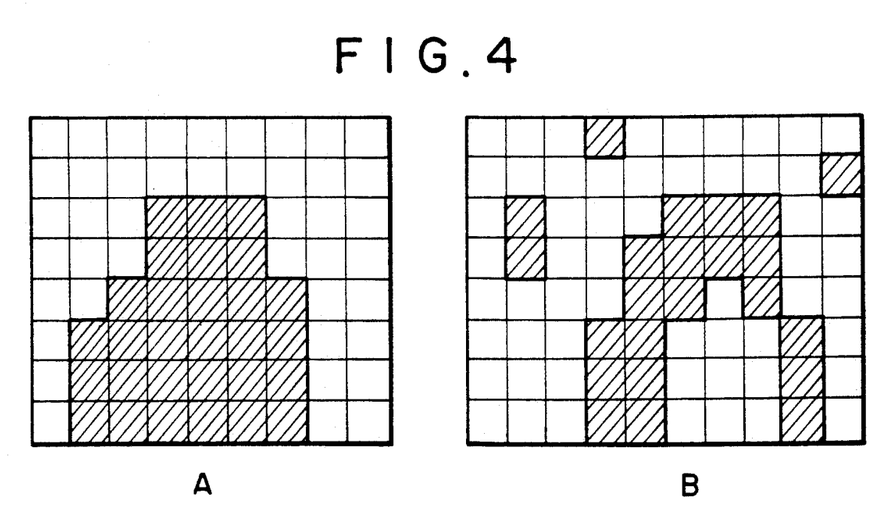
FIG. 4 is a drawing for illustrating the principles of the present invention, which shows a first valid block map (B) and a fifth valid block map of the previous frame (A).

Now suppose a valid block map is obtained for frames at times t0 and t1, as illustrated in FIG. 4A, and the block is hereinafter referred to as a fifth valid block map or complete valid block map. And while the valid block map for the current frame, or the first valid block value is weighted with a first weight value, the valid block for the previous frame or the fifth valid block map is weighted with a second weight value. An example of the weighting is described as follows.

Figure 5:
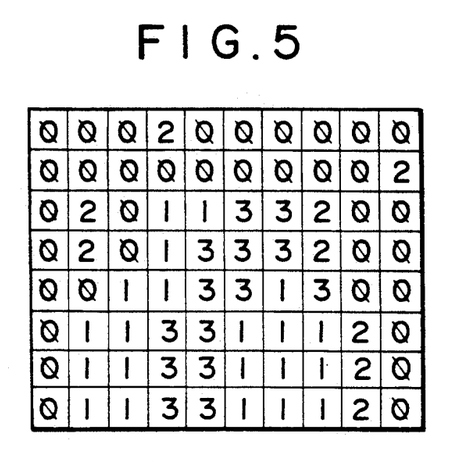
FIG. 5 is a drawing for illustrating the principles of the present invention, which shows a second valid block map.

Suppose for example the weight value for valid blocks of the previous frame is "1" and that for its invalid blocks is "0", and the weight value for valid blocks of the current frame is "2" and that for its invalid blocks is "0" like that for the invalid blocks of the previous blocks. After weighting the valid block maps of the current and previous frames as mentioned above, the valid block maps are summed up to obtain a second valid block map. The second valid block map is illustrated in FIG. 5.

Figure 6:
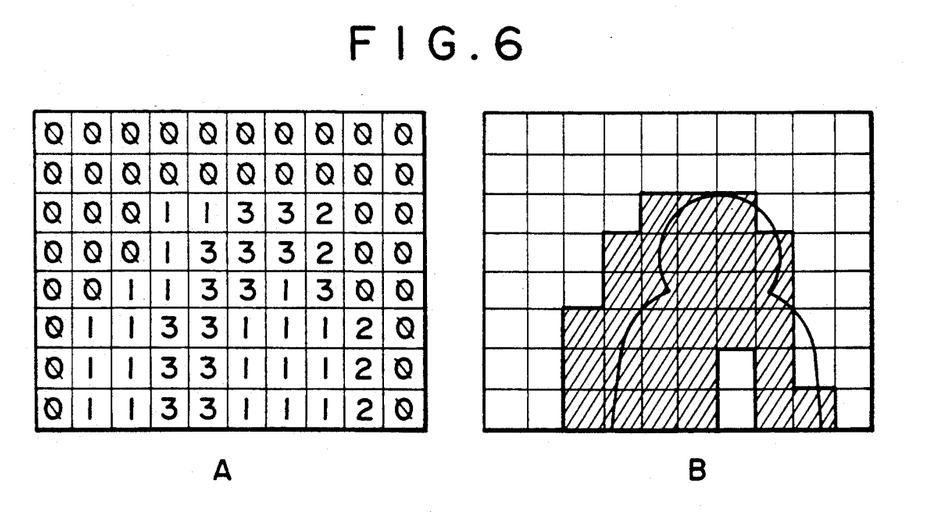
FIG. 6 is a drawing for illustrating the principles of the present invention, which shows a third valid block map (A), and an example incomplete encoding image caused by the third valid block map (B).
Figure 7:
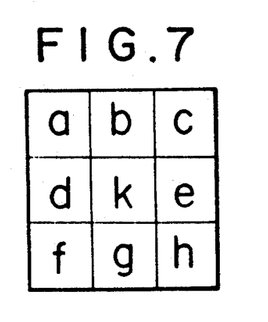
FIG. 7 is a drawing for illustrating the principles of the present invention, which shows a block to be processed and neighbor blocks for segmentation.
Figure 8:
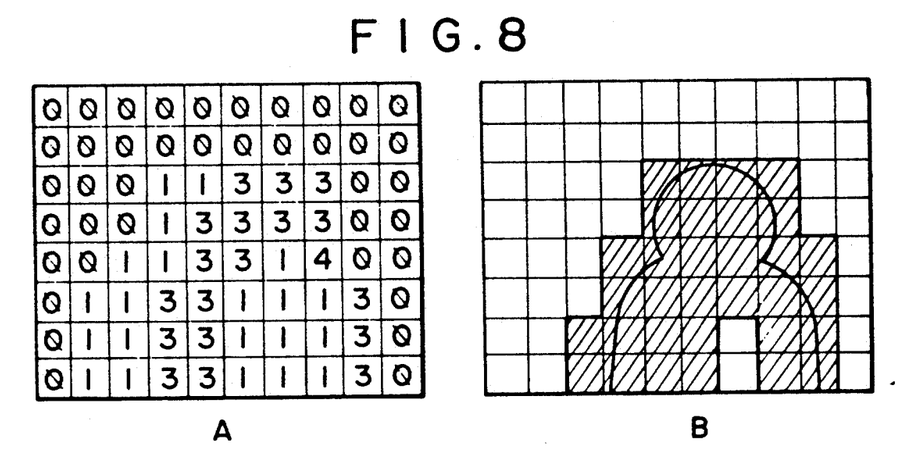
FIG. 8 is a drawing for illustrating the principles of the present invention, which shows a fourth valid block map (A), and the valid area in the fourth valid block map (B).

Next, segmentation is performed based on the composed valid block map. An example of the segmentation is described with reference to FIGS. 5, 6, 7, and 8. In the valid block map, each block to be processed is set as valid, if the sum of the values of the block and the eight neighboring blocks, that is, a block "k" and blocks "a", "b", "c", "d", "e", "f", "g", and "h" in FIG. 7, is larger than or equal to a predetermined threshold value, and the block to be processed is set as invalid, if the sum value is less than the threshold value. A third valid block map is accordingly obtained as illustrated in FIGS. 6A and 6B.

However, the above segmentation which uses the same threshold for all the blocks may make some blocks in the moving direction side area to be set as valid, changed to invalid and some portions of the person's figure are dropped off as shown in FIG. 6B, and the encoded image is degraded.

For avoiding that deterioration, values of the most left side valid blocks along horizontal block lines in the third valid block map are summed up, and likewise values of the most right side valid blocks along the horizontal block lines in the map are summed up. The difference between the left side valid block sum value and the right side valid block sum value is then calculated, and if the absolute value of the difference is larger than a predetermined third threshold value, then the valid blocks on the side having the larger sum value are weighted with a third weight value to avoid the valid area from dropping off.

As seen from the illustration of FIG. 6A, the sum of the values of the most left side valid blocks along the horizontal block lines is "6" and the sum of the values of the most right side valid blocks along the horizontal block lines is "13". Suppose the absolute value of the difference between the left and right side sums "7" (=13−6) is larger than the threshold. Then, the valid blocks on the right side are weighted with the third weight. In this case, the most right side valid blocks along the horizontal block lines are added by one and another valid block map is obtained as illustrated in FIG. 8A.

After the weighting with the third weight as shown in FIG. 8A, each block in the third valid block map is set as valid with reference to the neighbor blocks if the sum value of the block and the neighbor blocks is larger than or equal to a predetermined fourth threshold value, and the block is set as invalid if the sum is less than the fourth threshold value. As a result, a fourth valid block map is obtained as illustrated in FIG. 8B in which valid areas are indicated with hatching.

If the absolute value of the difference between the sums of the values of the blocks on the left and right sides is less than the third threshold value, there is no significant movement direction. Accordingly, the weighting with the third weight is not performed. And each block in the third valid block map is set as valid with reference to the neighboring blocks, if the sum value of the block and the neighboring blocks is larger than or equal to a predetermined fifth threshold value, and the block is set as invalid if the sum is less than the fifth threshold value. As a result, the fourth valid block map is obtained.

Figure 9:
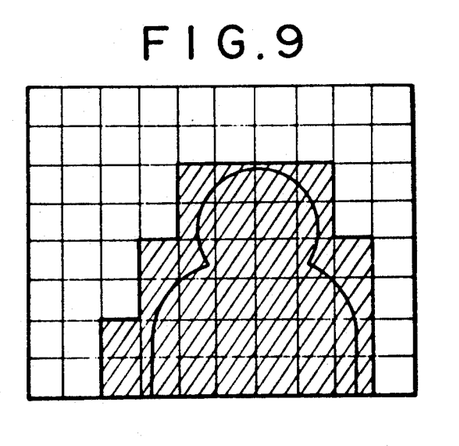
FIG. 9 is a drawing for illustrating the principles of the present invention, which shows the valid area in a fifth valid block map.

As shown in FIG. 8B, there can be isolated invalid blocks in the valid region. If encoding is applied to only valid blocks in the fourth valid block map, the isolated invalid blocks in the valid region are not encoded, and an image of the previous frame remains at the isolated invalid blocks and causes discontinuation with the surrounding blocks. This may result in significant deterioration of the encoded image. For resolving the issue, the same processing is applied to the isolated invalid blocks as used for the segmentation mentioned above. More particularly, in the fourth valid block map, each invalid block is checked with reference to the neighboring blocks, and if the sum of the values of the neighboring blocks is larger than or equal to a predetermined sixth threshold value, then the invalid block is filled with a value indicating validity. By this operation, the area of isolated invalid blocks in FIG. 8B is removed, and a fifth valid block map is obtained. FIG. 9 illustrate the fifth valid block map wherein the valid blocks are indicated with hatching.

Thereafter, the area of valid blocks or the speaker area of FIG. 9 is encoded by using interframe and/or inframe correlations, and unnecessary information caused by the noise in the background is accordingly reliably removed. Therefore coding efficiency is improved.

The above threshold and weighting values are determined based on statistical experiments. The arrangement of reference picture elements for the segmentation and the isolated block removal can be varied from the above.

DETAILED DESCRIPTION OF A PREFERRED EMBODIMENT

One embodiment of the present invention is now described with reference to the drawings.

Figure 1:
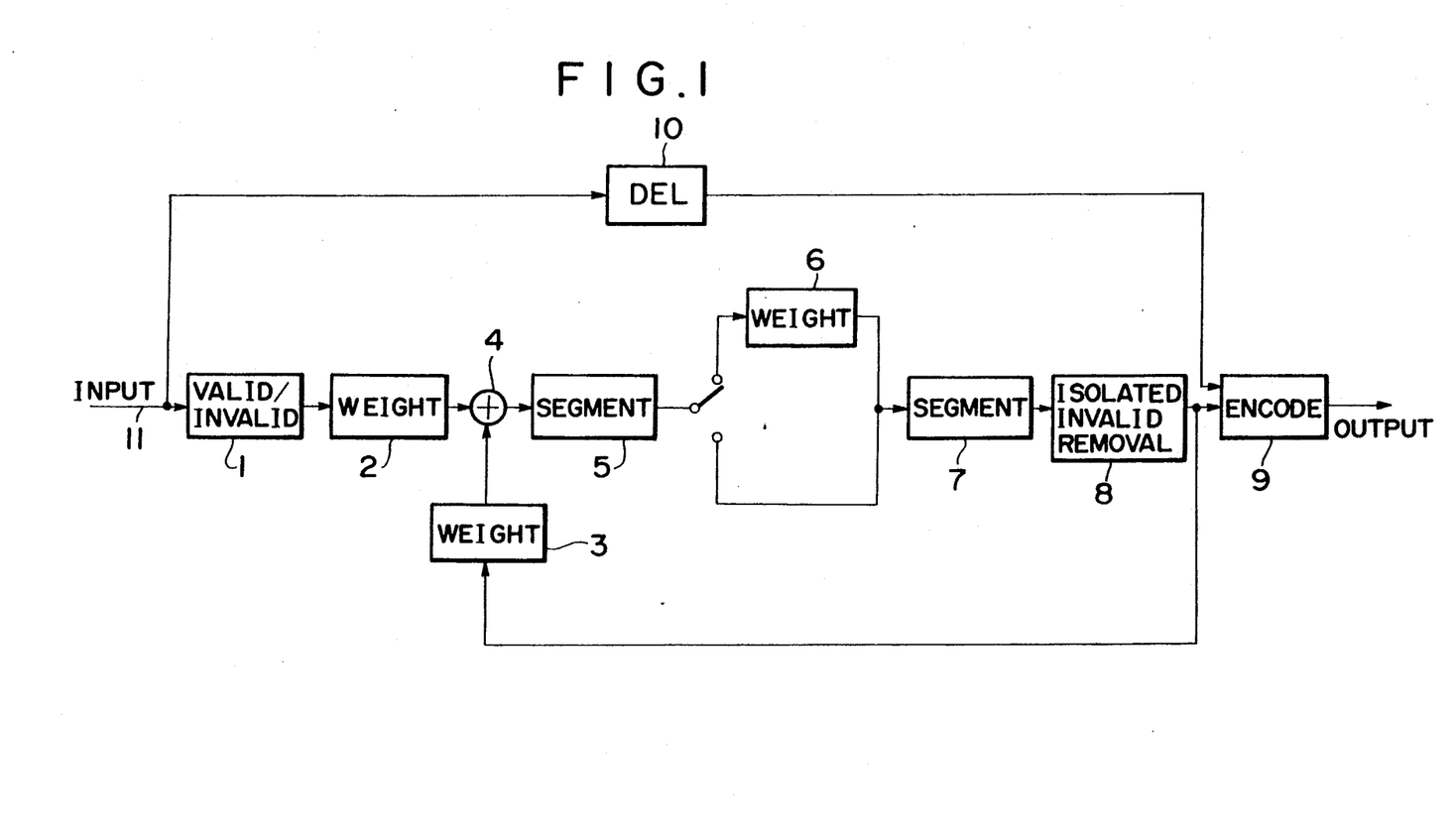
FIG. 1 is a block diagram illustrating an embodiment of the present invention.

FIG. 1 shows the embodiment, in which an inputted motion picture signal is fed to a valid/invalid detection section 1 and a delay element 10 via a line 11. The valid-/invalid detection section 1 stores a motion picture signal of a previous frame, and acquires the frame differential signal between the motion picture signal of the previous frame and the newly inputted frame via the line 11, and divides the frame differential signal into blocks of picture elements in m rows and n columns, and then calculates for each block the absolute value of the sum of frame differential values in the block. The valid/invalid detection section 1 further labels each block with "valid block" if the absolute value of the sum of the frame differential values in the block is larger than or equal to a predetermined first threshold value, and labels the block with "invalid block" if the absolute value of the sum of the differential values is less than the first threshold value, and accordingly obtains a first valid block map. The absolute value of the sum of the differential values can be replaced with a sum of squares, or the number of picture elements having values exceeding a threshold value.

The valid block signal obtained through the valid/invalid detection section 1 is fed to a weight section 2 which in turn performs a predetermined first weighting operation on valid blocks in the valid block map fed from the valid/invalid detection section 1 to modify the values of the valid blocks. The first valid block map weighted within the weight section 2 is fed to a sum section 4 which sums the first valid block map thus fed and a fifth valid block map to generate a second valid block map thus weighted. The second valid block map obtained in the sum section 4 is fed to a segmentation section 5.

The segmentation section 5 calculates for every block in the second valid block map the sum of the values of the block and neighboring blocks, and makes the block an invalid block if its sum is less than a predetermined third threshold value to obtain a third valid block map.

The values in the third valid block map fed from the segmentation section 5 are checked along each horizontal block line in the map, from the left to the right, and the value of the first coming valid block is determined as the value at the left edge of the block line. Likewise, the values in the block map are checked along each horizontal block line, from the right to the left, and the value of the first coming valid block is determined as the value of the right edge of the block line. Thereafter, the sum of the values of the valid block on the left edges and that on the right edges are obtained, and the difference between the sums of the values of the valid blocks on the left edges and right edges is then calculated. If the absolute value of the difference is larger than or equal to a predetermined third threshold, then the valid blocks on the edge having a larger sum are weighted in a weight section 6 by addition of a predetermined value.

The third valid block map which has undergone the third weighting operation is fed to a another segmentation section 7 in which each block is made a valid block if the sum of the values of the block and neighboring blocks is larger than or equal to a predetermined fourth threshold and the block is made an invalid block if the sum is less than the fourth threshold to generates a fourth valid block map.

When the difference between the sums of values of the valid blocks on the left and right sides is less than the third threshold value, in the segmentation section 7, each block is made a valid block if the sum of the values of the block and neighboring blocks is larger than or equal to a predetermined fifth threshold and the block is made an invalid block if the sum is less than the fifth threshold to generates the fourth valid block map.

As illustrated in FIG. 6, suppose that a block "k" is a block to be processed and that neighboring blocks are for example blocks "a", "b", "c", "d", "e", "f", "g", and "h". If the sum of the their values is larger than or equal to the predetermined threshold value, then the block "k" is made a valid block, and the sum is less that the threshold value, then the block "k" is made an invalid block.

The fourth valid block map obtained through the segmentation section 7 is supplied to an isolated invalid block removal section 8. The removal block section 8 removes isolated invalid blocks or invalid blocks in a valid block area to connect valid blocks. This process is performed with reference to neighboring blocks like the segmentation, by changing an invalid block to be processed into a valid block if the sum of values of the block and neighboring blocks is larger than or equal to a predetermined sixth threshold value. Thus, a fifth valid block map in which isolated invalid blocks have been removed is obtained.

The fifth valid block map thus obtained is supplied to another weight section 3 which performs a predetermined second weighting operation on valid blocks in the fifth valid block map to modify the values of the valid blocks, and supplies the modified fifth valid block map to the sum section 4 upon the next frame processing.

The delay section 10 compensates an inputted motion picture signal for the time delay from the time when the motion picture signal is inputted to the time the fifth valid block map is supplied to an encoding section 9, and arraigns the timing of the fifth valid block map and the inputted signal. The time compensated signal outputted from the delay section 10 is fed to the encoding section 9.

The encoding section 9 does encode only a part of the motion picture signal inputted from the delay section 10 corresponding to the valid blocks of the fifth valid block map fed from the isolated invalid block removal section 8, that is, corresponding to a portion indicated as a speaker area, but doesn't encode the background part indicated with the invalid blocks. For the encoding, methods utilizing a correlation between frames, such as motion compensation, methods utilizing a correlation in a frame such as orthoganal conversion, and methods utilizing correlations between frames and/or in a frame can be used.

The above threshold values are determined according to values statistically obtained beforehand.

As seen from the above detailed description of the preferred embodiment, according to the present invention, only a speaker area obtained by segmentation is encoded, and unnecessary information caused by noise in the background is removed, and the encoding efficiency is accordingly improved.

Although the embodiment of the present invention have been described, it is understood that numerous variations may be made in accordance with the principles of the invention.

What is claimed is:

1. A motion picture signal encoding method utilizing a correlation between images of an N-th frame and an (N−1)-th, N being an integer larger than one, said method comprising the steps of:
   (a) generating a first valid block map for said N-th frame, by dividing images of said (N-th) frame and corresponding (N−1)-th frame into blocks of a plurality of picture elements, detecting for each of said blocks, a difference between said images of said N-th frame and said (N−1)-th frame, making each of said blocks a valid block, if said difference of said blocks is larger than or equal to a predetermined first threshold value, and making each of said blocks and invalid block, if said difference of said blocks is less than said first threshold value;
   (b) generating a second valid block map for said N-th frame, be weighting said first valid block map with a first weighting factor, weighting a complete valid block map generated for said (N−1)-th frame with a second weighting factor, and composing said weighted first and complete valid block maps by sum operations;
   (c) generating a third valid block map for said N-th frame, by making each of said valid blocks of said second valid block map an invalid block, if a sum of values of said valid blocks and neighboring blocks is less than a predetermined second threshold value;
   (d) generating a fourth valid block map for said N-th frame, by,
      obtaining a sum of values of said valid blocks at the most left locations along horizontal block lines in said third valid block map, obtaining a sum of values of said valid blocks at the most right locations along horizontal block lines in said third valid block map, if a difference between said sums is larger than or equal to a third threshold value, then weighting said valid blocks at the most left or right locations having the greater sum with a third weighting factor and further making each of said blocks of said third valid block map thus weighed a valid block, provided that, a sum of values of said blocks and said neighboring blocks is larger than or equal to a fourth threshold value and making each of said blocks of said third valid block map thus weighed an invalid block, provided that, a sum of values of said block and said neighboring blocks is less than said fourth threshold value to generate said fourth valid block map;

if said difference between said sums is less than said third threshold value, then making each of said blocks of said third valid block map a valid block, provided that, a sum of values of said blocks and said neighboring blocks is larger than or equal to a fifth threshold value and making each of said blocks of said third valid block map an invalid block, provided that, a sum of values of said blocks and said neighboring blocks is less than said fifth threshold value to generate said fourth valid block map;

(e) generating said complete valid block map for said N-th frame, by making each of said invalid blocks of said fourth valid block map a valid block, if a sum of values of said neighboring blocks is larger than or equal to a predetermined sixth threshold value;

(f) encoding only a part of said image of said frame corresponding to said valid blocks of said complete valid block map by using correlations between N-th and (N−1)-th images and/or in an image; and (g) repeating said steps (a) through (f) with said N being replaced with (N+1).

2. A motion picture signal encoding method according to claim 1, wherein said threshold values are determined statistically.

3. A motion picture signal encoding method according to claim 2, wherein said neighboring blocks are eight blocks adjacent to a block to be processed.

4. A motion picture signal encoding apparatus utilizing a correlation between images, comprising:

means for generating a first valid block map for each frame, by dividing images of said frame and corresponding reference frame into blocks of a plurality of picture elements, detecting for each of said blocks difference between said images of said frame and said reference frame, making each of said blocks a valid block if said difference of said block is larger than or equal to a predetermined first threshold value, and making said block an invalid block if said difference of said block is less than said first threshold value;

means for generating a second valid block map for each of said frames, by weighting said first valid block map with a first weighting factor, weighting a complete valid block map generated for a previous frame with a second factor, and composing said weighted first and complete valid block maps by sum operations;

means for generating a third valid block map for each of said frames, by making each of said valid block of said second valid block map an invalid block if a sum of values of said valid block and neighbor blocks is less than a predetermined second threshold value;

means for generating a fourth valid block map for each of said frames, by,
  obtaining a sum of values of valid blocks at the most left locations along horizontal block lines in said third valid block map, obtaining a sum of values of valid blocks at the most right locations along horizontal block lines in said third valid block map.

if a difference between said sums is larger than or equal to a third threshold value then weighting valid blocks at the most left or right locations having the greater sum with a third weighting factor and further making each block of said third valid block map thus weighted a valid block provided that a sum of values of said block and neighbor blocks is larger than or equal to a fourth threshold value and making each of said block of said third valid block map thus weighted an invalid block provided that a sum of values of said block and neighbor blocks is less than said fourth threshold value to generate said fourth valid block map;

if said difference between said sums is less than said third threshold value then making each block of said third valid block map a valid block provided that a sum of values of said block and neighbor blocks is larger than or equal to a fifth threshold value and making each of said block of said third valid block map an invalid block provided that a sum of values of said block and neighbor blocks is less than said fifth threshold value to generate said fourth valid block map;

means for generating said complete valid block map for each of said frames, by making each of invalid blocks of said fourth valid block map a valid block if a sum of values of neighbor blocks is larger than or equal to a predetermined sixth threshold value; and means for encoding only a part of said image of said frame corresponding to valid blocks of said complete valid block map by using correlations between images and/or in a image.

5. A motion picture signal encoding method, comprising the steps of:

(a) receiving an inputted motion picture signal for a N-th frame, N being an integer larger than one;

(b) locating an area covering an interest part of said motion picture signal for said N-th frame, wherein said locating step includes the steps of:

generating a first valid block map for said N-th frame, by dividing images of said N-th frame and corresponding (N−1)-th frame into blocks of a plurality of picture elements, detecting for each of said blocks, a difference between said images of said N-th frame and said (N−1)-th frame, making each of said blocks a valid block, if said difference of each of said blocks is larger than or equal to a predetermined first threshold value, and making each of said blocks an invalid block, if said difference of each said blocks is less than said first threshold value;

generating a second valid block map for said N-th frame, by weighting said first valid block map with a first weighting factor, weighting a complete valid block map generated for said (N−1)-th frame with a second weighting factor, and composing said weighted first and complete valid blocks map by sum operations;

generating a third valid block map for said N-th frame, by making each of said valid block of said second valid block map an invalid block, if a sum of values of said valid blocks and said neighboring blocks is less than a predetermined second threshold;

detecting a movement direction of said interest part; and generating a fourth valid block map for said N-th frame, by weighting said valid blocks of said third valid block map, according to said movement direction thus detected, and further making each of said blocks of said third valid block map thus weighed a valid block, provided that, a sum of values of said blocks and said neighboring blocks is larger than or equal to a fourth threshold value and making each of said blocks of said third valid block map thus weighed an invalid block, provided that, a sum of values of said blocks and said neighboring blocks is less than said fourth threshold value to generate value to generate said fourth valid block map, said valid blocks of said fourth valid block map being located as said area covering said interest part;

(c) responsive to said located area, extracting said interest part from said motion picture signal for said N-th frame;

(d) encoding only said interest part of said motion picture signal thus extracted by using correlations between N-th and (N−1)-th images and/or in an image; and (e) repeating said steps (a) through (d) with said N being replaced with (N+1).

* * * * *